United States Patent
Yasuda et al.

(10) Patent No.: US 6,933,921 B2
(45) Date of Patent: Aug. 23, 2005

(54) MOBILE SYSTEM WITH ERGONOMICALLY IMPROVED USER POINTING SUBSYSTEM

(75) Inventors: Hiroaki Yasuda, Fujisawa (JP); Fusanobu Nakamura, Yamato (JP); Mitsuo Horiuchi, Sagamihara (JP); David Andrew Sawin, Tucson, AZ (US)

(73) Assignee: Lenovo (Singapore) Pte LTD, Singapore (SG)

( * ) Notice: Subject to any disclaimer, the term of this patent is extended or adjusted under 35 U.S.C. 154(b) by 309 days.

(21) Appl. No.: 10/249,350

(22) Filed: Apr. 2, 2003

(65) Prior Publication Data

US 2004/0027333 A1 Feb. 12, 2004

(30) Foreign Application Priority Data

Apr. 3, 2002 (JP) ........................................ 2002-101041

(51) Int. Cl.[7] ............................. G09G 5/00; G09G 5/08; G06F 1/16
(52) U.S. Cl. ....................... 345/157; 345/168; 345/173; 361/680; D14/318
(58) Field of Search ................................. 345/156–184; 361/679–686; 248/118–118.3; 273/148 B; D14/318

(56) References Cited

U.S. PATENT DOCUMENTS

| | | | | |
|---|---|---|---|---|
| 5,621,610 A | * | 4/1997 | Moore et al. | 361/680 |
| 5,644,469 A | * | 7/1997 | Shioya et al. | 361/681 |
| 5,655,743 A | * | 8/1997 | Gillis | 248/346.01 |
| 5,755,410 A | * | 5/1998 | Ambrose et al. | 248/118 |
| 5,975,780 A | * | 11/1999 | Fukami | 400/691 |
| 6,091,600 A | * | 7/2000 | Jeong | 361/680 |
| 6,262,716 B1 | * | 7/2001 | Raasch | 345/168 |
| 6,700,773 B1 | * | 3/2004 | Adriaansen et al. | 361/680 |
| 2001/0028548 A1 | * | 10/2001 | Oura et al. | 361/680 |

* cited by examiner

*Primary Examiner*—Xiao Wu
*Assistant Examiner*—M. Fatahiyar
(74) *Attorney, Agent, or Firm*—Carlos Munoz-Bustamante (57) ABSTRACT

Provide is an input device that can be incorporated into a notebook computer that exhibits improved operability even in the case of including both a stick-type and a pad-type pointing devices. A Pad face of a pad-type pointing device is configured to incline against the horizon when a computer is used or against the operation face of a keyboard while lowering the keyboard side. A first button for stick-type pointing device, a guide member for fixing the pad face, and the pad face are configured to be adjacent to one another to make the height of the top surface of the guide member being almost as high as the top surface of the pressed first button. A button with a long stroke is used for a first button to improve usability.

18 Claims, 5 Drawing Sheets

MOBILE SYSTEM WITH ERGONOMICALLY IMPROVED USER POINTING SUBSYSTEM

BACKGROUND OF THE INVENTION

The present invention relates to an input device having a keyboard and a pad-type and/or a stick-type pointing device, and a notebook computer having the input device.

A notebook computer typically uses, as an input device, not only keyboard but also a pointing device such as a pad-type or a stick-type pointing device. Such pointing devices are used mainly for moving a mouse cursor on a screen and causing an operation for the position of the mouse cursor. A mouse cursor is moved by operating a pad with one's finger in case of a pad-type pointing device, and by operating a stick with one's finger in case of a stick-type pointing device. For both of the pad-type and stick-type pointing devices, a user can perform an input operation corresponding to an mouse operation such as clicking by pressing an attached button. A stick is generally placed in the middle of "B", "G", and "H" keys, with an associated button for stick operation being placed on the user's side from a space key. A pad is also placed on the user's side from a space key, with an associated button for a pad being placed on the user's side from a pad.

There has also been a notebook computer including both a stick-type and a pad-type pointing device. In this case, a stick and a button for stick operation are placed as mentioned above. A pad is placed on the user's side from a button for stick operation, while a button for a pad is placed on the user's side from a pad.

In such a case where a computer includes both a stick-type and a pad-type pointing device, a user can accidentally touch a pad while operating a button for stick operation, resulting in a cursor jumping to an unexpected position. In order to solve this problem, various solutions have been proposed.

In one proposal, an accidental touch on a pad during use of a button for stick operation is prevented by placing the button for stick operation extremely close to a space key with enough distance from a pad. However, this causes a conflict between operations of a space key and the button for stick operation, which sacrifices operability of the button for stick operation.

In another proposal, a pad is placed at enough distance from a button for stick operation by adopting a smaller button for stick operation. However, the button for stick operation is too small to maintain operability thereof.

In yet another proposal, an accidental touch on a pad in pressing a button for stick operation is avoided by adopting as the button a button with a short stroke of approximately 0.3 mm, for example. However, in this case, when pushing down the short stroke button for switching, the clicking requires a large clicking force with a large clicking sound. This type of design also shortens the life of the button.

As a solution other than the above-mentioned proposals, it is also possible to place a button for stick operation at enough distance from a pad with the button for stick operation having a conventional arrangement and configuration. However, in this case, it is difficult to operate both the keyboard and the pad in parallel. This type of solution also requires too big a palm rest, which results in lower operability of the whole keyboard.

The present invention intends to provide an input device with good operability even in the case of including both of a stick-type and a pad-type pointing device as well as a notebook computer having the input device.

BRIEF SUMMARY OF THE INVENTION

To accomplish this purpose, an input device of a first invention is an input device including a keyboard and a pad face of a pad-type-pointing device fixed on the user's side from the keyboard, wherein the pad face is adapted to incline against the horizon when it is used or against the operation face of the keyboard while lowering the keyboard side.

Here, as an input device, a device appropriate for a notebook computer, for example, is used. For example, a pad-type pointing device such as a device called a touch pad, is used. Typically, a pad-type pointing device is provided with a button for a function corresponding to a click on a mouse. The pad is for moving a mouse cursor or performing a function corresponding to a click on a mouse by manipulating the pad face. Other manipulation on a pad face including padding on the face can be substituted for the button.

When a user manipulates a pad face with his/her hands at the home position on a keyboard in this configuration, the user has to open the index fingers on the home position and the thumbs on the pad face to some extent to adjust the angle between the index fingers and the thumbs according to manipulation on the pad face. That is to say, the angle should be smaller to manipulate the keyboard side of the pad face, while the angle should be bigger to manipulate the user's side of the pad face. As the pad face inclines toward the keyboard at that moment, when a user moves his/her thumb on the pad face toward the keyboard decreasing the angle between his/her thumb and index finger, his/her thumb goes downward on the pad face. In contrast, when a user moves his/her thumb on the pad face toward the user's side increasing the angle between his/her thumb and index finger, his/her thumb comes upward on the pad face. A user can move his/her thumb along a pad face easier; thus, the user can more surely keep touching his/her thumb on the pad face than on a conventional horizontal pad face. An incline of a pad face contributes to optimize an arrangement and a configuration of each part in terms of operability in the case of including a stick-type-pointing device along with a pad-type pointing device as described below.

An input device of a second embodiment is the input device according to the first embodiment including a palm rest fixed on the keyboard and the pad face, wherein the operation face of the keyboard and a surface of the palm rest are placed almost on the same level, with the pad face inclining against the level.

An input device of a third embodiment is the input device according to the second embodiment including a stick for a stick-type pointing device provided on the keyboard, a first button for the stick-type pointing device provided between the keyboard and the pad face, and a guide member placed between the first button and the pad face for fixing the pad face in place. As a stick-type pointing device, a device called TrackPoint or AccuPoint is used.

An input device of a forth embodiment is the input device according to the third embodiment wherein the first button, the guide member, and the pad face are placed adjacent to one another. An input device of a fifth embodiment is the input device according to the forth embodiment wherein the top surface of the guide member is almost as high as the highest part of the pressed first button.

An input device of a sixth embodiment is the input device according to the fifth embodiment wherein a stroke of the first button ranges from 0.8 to 1.5 mm.

An input device of a seventh embodiment is the input device according to the third embodiment, including a second button for the pad-type pointing device provided on the user's side from the pad face, and a guide member placed between the pad face and the second button for fixing the pad face in place, wherein a difference between heights of the top surface of the guide member and a second button end of the pad face is small enough for a user to easily manipulate an area around the second button end of the pad face.

An input device of an eighth embodiment is the input device according to the seventh embodiment wherein a stroke of the second button ranges from 0.8 to 1.5 mm.

An input device of a ninth embodiment is the input device according to the third embodiment wherein an angle of the pad face inclining against the level of the operation face of the keyboard and the surface of the palm rest is approximately 3.8 degrees. A notebook computer of a tenth embodiment including an input device according to any one of embodiments from a first embodiment to a ninth embodiment, wherein the computer is adapted to fold with a display screen thereof and an operation face of the input device meeting face to face.

The above summary of the invention does not enumerate all of the necessary features for the present invention, but some combinations of these features may be also inventive features.

BRIEF DESCRIPTION OF THE SEVERAL VIEWS OF THE DRAWINGS

Some of the purposes of the invention having been stated, others will appear as the description proceeds, when taken in connection with the accompanying drawings, in which:

FIG. 3 is a diagram showing a problem in the case when a pad face is placed horizontally at an ideal place against a touch pad button and the like;

FIG. 6 is a diagram showing a problem in the case when a pad face is level, it is too low in comparison with the level of a touch pad button and the like.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The present invention will be described in detail with respect to an embodiment thereof with reference to the accompanying drawings.

Figure 1:
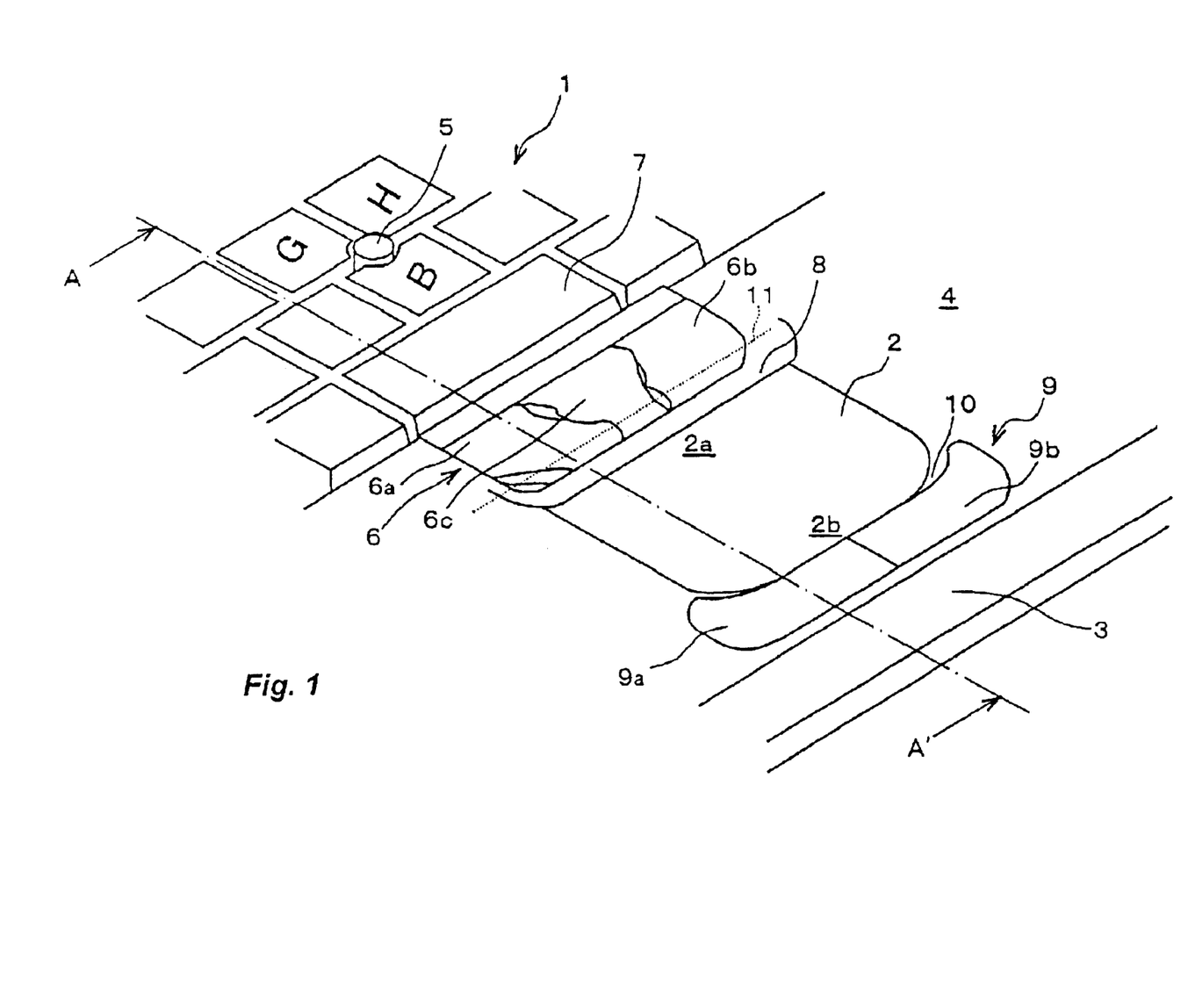
FIG. 1 is a perspective view of an essential part of a notebook computer of an embodiment according to the present invention.

Referring now more particularly to the accompanying drawings, FIG. 1 shows an essential part of a notebook computer of an embodiment according to the present invention. As it is shown in FIG. 1, this notebook computer includes keyboard 1 and pad face 2 of a touch panel fixed on the user's side from the keyboard. Pad face 2 inclines against the operation face of keyboard 1, while lowering the keyboard side. When this notebook computer is used on a desk, pad face 2 inclines against the horizon, while lowering the keyboard side. Reference numeral 3 in FIG. 1 denotes a keyboard bezel that is mounted with keyboard 1, a touch panel, etc.

Palm rest 4 is fixed to keyboard 1 and pad face 2. In other words, palm rest 4 forms a part of keyboard bezel 3. The operation face of keyboard 1 and the surface of palm rest 4 are placed almost on the same level. Pad face inclines about 3.8 degrees against this level.

Stick 5 for TrackPoint (Trademark of IBM Corporation, Armonk, N.Y.) is provided on keyboard 1, while button 6 for TrackPoint is provided between keyboard 1 and pad face 2. This arrangement is same as those in the conventional art. Stick 5 for TrackPoint is placed in the middle of keys "B", "G", and "H", while button 6 for TrackPoint is placed on the user's side from space key 7 on keyboard 1. This embodiment is adapted to cause a computer to perform a process associated with a place of a cursor by a user's operation of moving a mouse cursor on a screen of a notebook computer with TrackPoint stick 5 and pressing TrackPoint button 6. TrackPoint button 6 consists of left button 6a, right button 6b, and center button 6c. For example, left button 6a can be assigned to a function of left button of a mouse, right button 6b can be assigned to a function of right button of a mouse, and center button 6c can be assigned to a wheel of a mouse and the like, respectively. A dotted line 11 in FIG. 1 shows a rough position on TrackPoint button 6 pressed by a user's finger.

Keyboard end 2a of pad face 2 is lower than the highest part of pressed track button 6. A button with a stroke as big as conventional arts, approximately 1.3 mm, for example, is adopted for TrackPoint button 6 in order to improve operability. The stroke of button 6 is bigger than that of a snap dome-type switch ranging from 0.1 to 0.5 mm. This long stroke is achieved by combining a rubber part called rubber dome and a mechanism for stabilizing a stroke at the film-type contact. With this mechanism, a long stroke ranges from 0.8 to 1.5 mm can be provided. This long stroke ensures good operability of a TrackPoint. If a stroke is as long as from 1.2 to 1.5 mm, operability can be further improved. Guide 8 placed between TrackPoint button 6 and pad face 2 applies a pressure on the keyboard end 2a of pad face 2 for fixing it. Guide 8 forms a part of keyboard bezel 3.

TrackPoint button 6, guide 8, and pad face 2 are adjacent to one another. That is to say, pad face 2 is placed not too far from keyboard 1 to keep good usability for a user familiar with the operation of keyboard 1 to manipulate keyboard 1 and pad face 2 in parallel. When a user uses keyboard 1 and touch pad in parallel, the user often put his/her index fingers on the home position of a keyboard, i.e., on keys "F" and "J" respectively, while manipulating pad face 2 with his/her thumb. In such a case, too much distance between pad face 2 and keyboard 1 requires a user to manipulate by moving his/her thumb to a large extent or moving his/her index finger off the home position. Pad face 2 and TrackPoint button 6 are placed close to each other as much as possible to avoid the above-mentioned inconvenience.

Button 9 for touch pad 2 is provided on the user's side from pad face 2. In the embodiment, a user can move a mouse cursor by moving his/her finger on pad face 2 and can cause a computer to perform a process associated with the placement of a mouse cursor by pressing touch pad button 9. Touch pad button 9 consists of left button 9a and right button 9b. Left button 9a and right button 9b can be assigned with, for example, functions of left button and right button of a mouse, respectively. A button with a long stroke is adopted for touch pad button 9 to improve operability as in the case of TrackPoint button 6. Guide 10 placed between touch pad button 9 and pad face 2 applies a pressure on touch pad button side end 2b of pad face 2 for fixing it.

Figure 2:
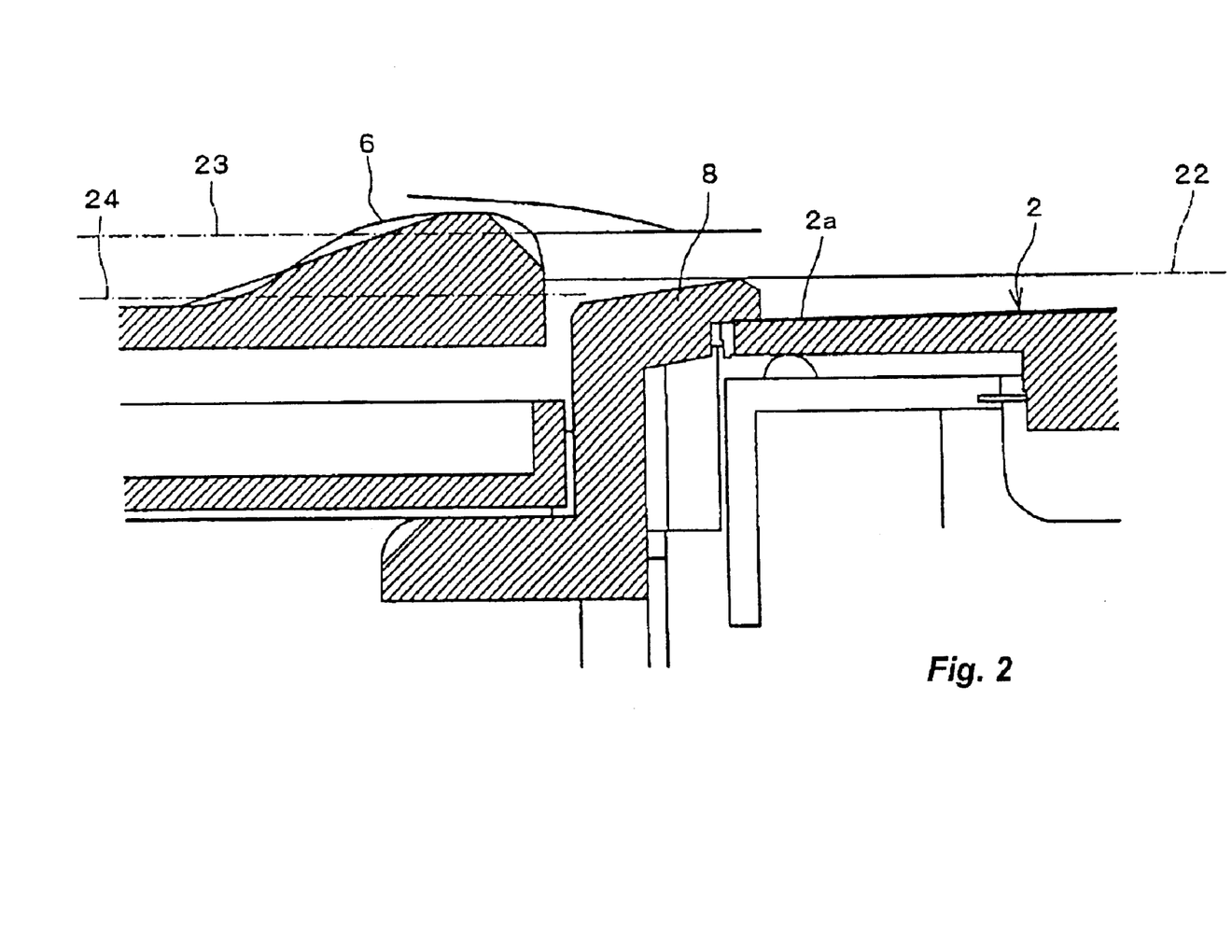
FIG. 2 is a part of a cross sectional view taken along line AA' shown in FIG. 1.

FIG. 2 is a part of a cross-sectional view taken along line AA' shown in FIG. 1 illustrating physical relationship of heights between TrackPoint button 6 and pad face 2. Guide 8 has an enough thickness for plastic molding, with the top surface being higher than the surface of keyboard end 2a of pad face 2. The top surface of guide 8 is almost at the same height of the highest part of pressed TrackPoint button 6. Thus, keyboard end 2a of pad face 2 is lower than the highest part of pressed TrackPoint button 6. Pad face 2 inclines while lowering the keyboard end 2a. This configuration allows an arrangement of each part that does not degrade operability of both TrackPoint and touch pad.

Figure 3:
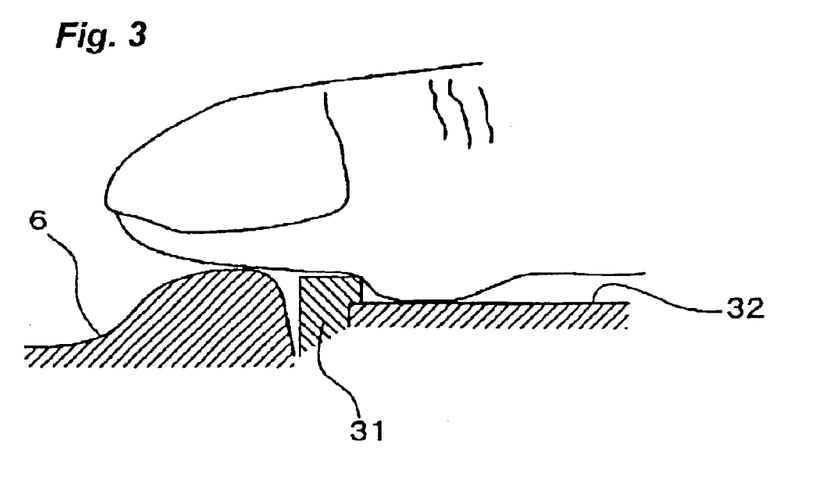

If pad face is placed horizontally at an ideal height concerning touch pad button 9, palm rest 4, or bezel 3 placed on the user's side, the height of pad face will be at the height indicated by dashed line 22 and the height of guide for attaching a pad is at the height indicated by dashed line 23. These heights are higher than an ideal height for TrackPoint button 6. That is to say, height of guide 23 is considerably higher than the height of the highest part of pressed TrackPoint button 6 indicated by dashed line 24, and TrackPoint button 6 has a large stroke as mentioned above. Thus, when a user tries to press TrackPoint button 6, the user has to press the button with his/her finger bending to form an upright position against the button to avoid pressing guide 31 that is higher than TrackPoint button 6 as shown in FIG. 3. When a user tries to press TrackPoint button 6 deeper, his/her finger may reach pad face 32 with guide 31 strongly pressing against the finger. As a result, this design more often causes a problem where a mouse cursor jumps in an unexpected direction, which lowers operability even though the button with long stroke is adopted for obtaining good operability of TrackPoint button 6.

Figure 4:
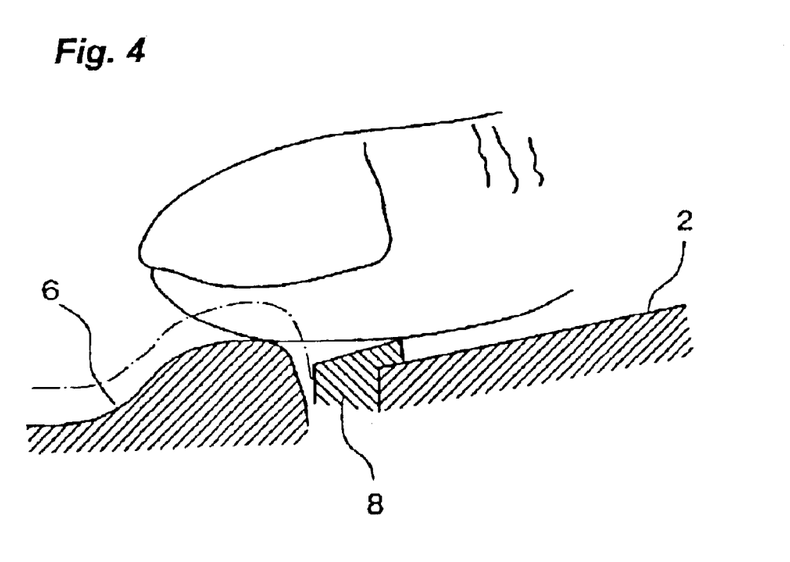
FIG. 4 is a diagram showing a solution to the problem shown in FIG. 3 solved by an embodiment according to the present invention.

The embodiment makes guide 8 considerably lower than the highest part of TrackPoint button 6 in normal position and almost as high as the highest part of pressed TrackPoint button 6. Thus, the highest part of TrackPoint button 6 supports a user's finger when the user is pressing the button as shown in FIG. 4 to prevent the finger from touching pad face 2. Therefore, the user can enjoy good operability accomplished by a long stroke of TrackPoint button 6 that is not degraded.

Figure 5:
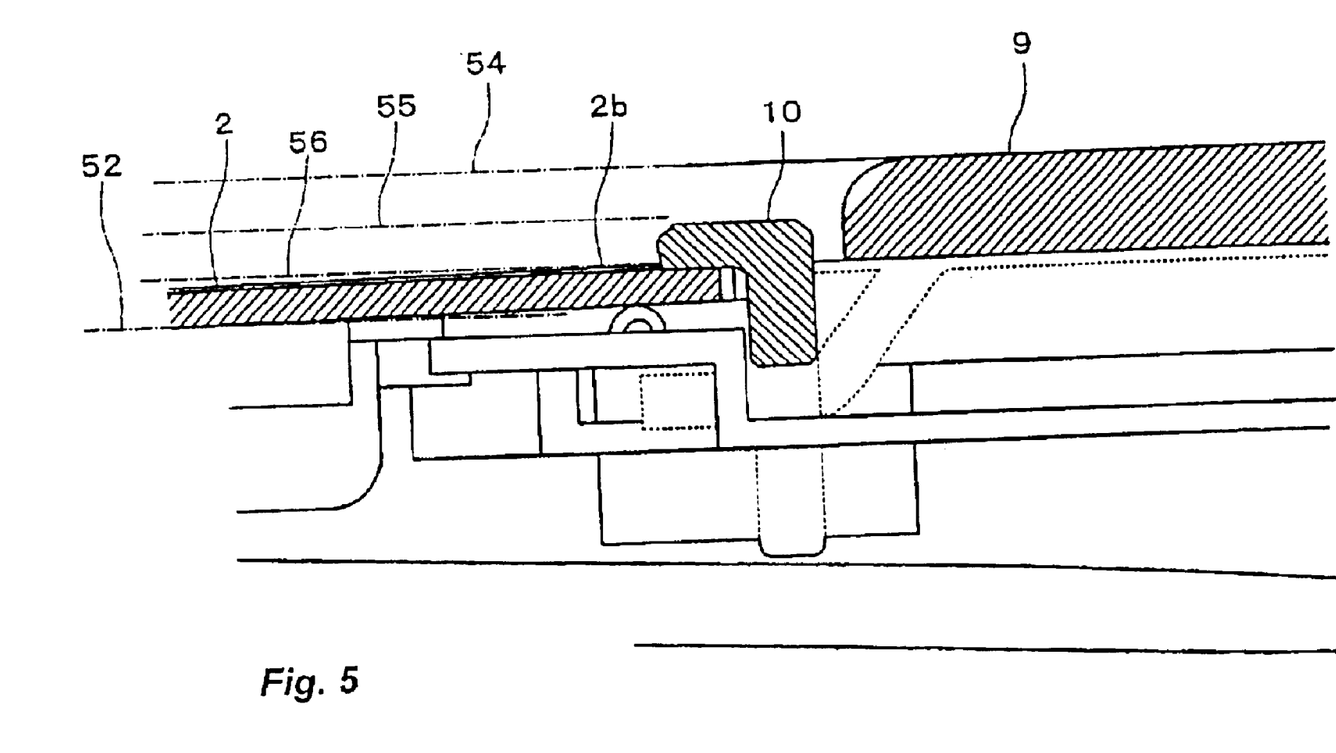
FIG. 5 is another part of the cross sectional view taken along line AA' shown in FIG. 1.
Figure 6:
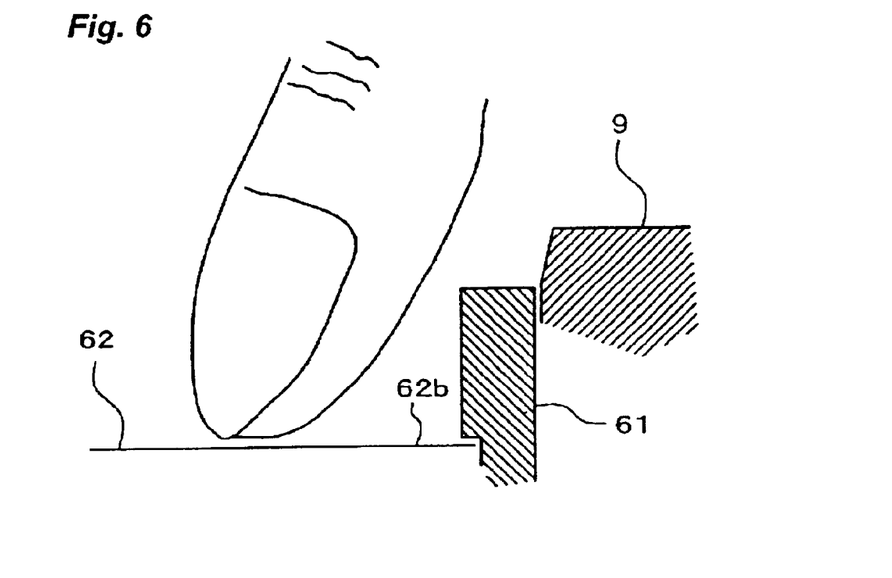

FIG. 5 is a cross sectional view taken along line AA' shown in FIG. 1 illustrating a part around a touch pad button. As mentioned above, TrackPoint button side end 2a of a pad face 2 is considerably lower than the highest part of TrackPoint button 6. Therefore, pad face 2 can be entirely placed horizontally on the level of the end 2a. If pad face 2 is placed in this manner, however, the level of pad face 2 will be at the height of dashed line 52 shown in FIG. 5. Pad face 62 is too low in comparison with the levels of touch pad button 9 and guide 61 as shown in FIG. 6, which degrades operability of touch pad button side end 62b of pad face 62. Touch pad button side end of a pad face can be assigned with various extensions to be used. Therefore, operability of touch pad button side end is important. The extensions include a function to move a pointer (cursor) continuously, or a function to scroll a screen, for example. The extensions also include such a function as to start up a function or application previously set for a button in response to a tap of a user's finger on a corner area of touch pad button side end.

Figure 7:
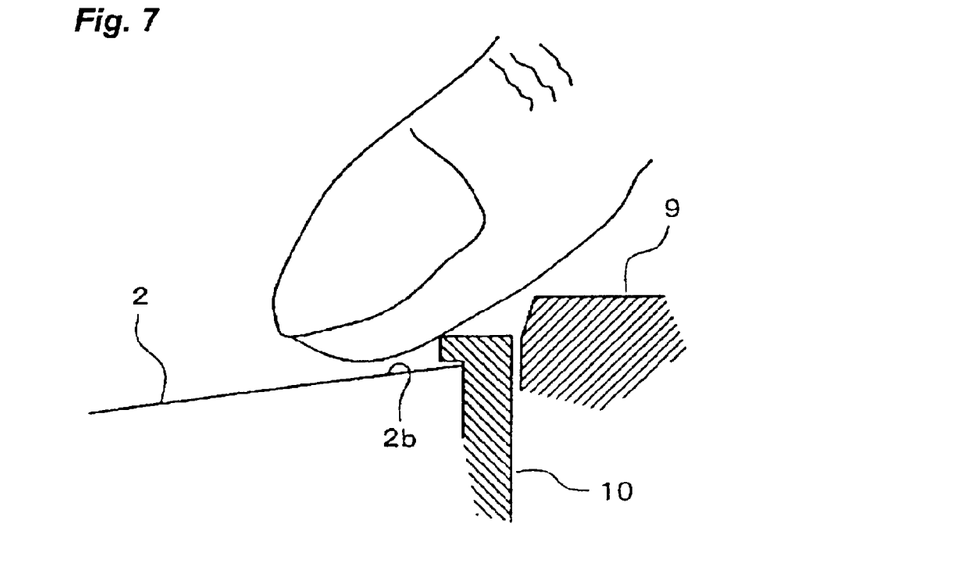
FIG. 7 is a diagram showing a solution to the problem shown in FIG. 6 solved by an embodiment according to the present invention.

The embodiment decreases a difference between a height of the top surface of guide 10 and a height of touch pad button side end 2b of a pad face to make it small enough for a user to easily manipulate the area around touch pad button side end 2b. That is to say, in the embodiment, pad face 2 inclines as mentioned above to make touch pad button side end 2b higher than TrackPoint button side end 2a, resulting in respective levels of touch pad button 9, guide 10, and pad face 2 being at the respective heights denoted by reference numerals 54, 55, and 56 shown in FIG. 5. The embodiment allows a user to manipulate touch pad button side end 2b with his/her finger in natural position as shown in FIG. 7.

Touch pad button 9 can be placed as low as TrackPoint button 6 and pad face 2 can be entirely placed horizontally also on the same level. However, as a long stroke of button is adopted also for touch pad button 9 to unify the operability of the touch pad button 9 into that of TrackPoint button 6, relationship between heights of touch pad button 9 and palm rest 4 also has a significant influence on operability. In other words, lowering of touch pad button 9 compared to palm rest 4 is undesirable, for it degrades operability accomplished by a long stroke of touch pad button 9.

As a notebook computer is desired to be thin, an operation face of keyboard 1, surface of palm rest 4, and surface of keyboard bezel 3 form almost the same level to be compactly folded against a plane display screen in this configuration. Therefore, when the notebook computer stands on a desk with the screen raised, the operation face of keyboard 1 lies almost on the horizon and pad face 2 inclines while lowering the keyboard side and raising the user's side. When a user operates the notebook computer, the user can manipulate pad face 2 by easily moving his/her thumb along inclined pad face 2 with both of his/her palms resting on palm rests 4, which are on both sides of pad face 2, and with each finger resting close to the home position on keyboard 1. Namely, a user can manipulate pad face 2 while manipulating keyboard 1 easier with more natural movement of his/her thumb than in the case of horizontal pad face 2.

A user can make a computer to perform a function corresponding to a left click or a right click of a mouse by pressing touch pad button 9a or 9b while manipulating pad face 2. At this moment, the user presses touch pad button 9 from the same height as that of the top surface of palm rest 4 or the top surface of keyboard bezel 3. The user enjoys good operability accomplished by a long stroke of touch pad button 9.

If user's side end 2b of a pad face is assigned with a startup function of an application or a function of scrolling a screen, a user can make the computer to perform the function by moving his/her finger along or tapping on the part. As the user's side end 2b of a pad face is higher than the opposite end 2a, a user can easily manipulate the end of pad face 2b, which does not sink too much below the level of palm rest 4, with his/her palms resting on palm rests 4.

When a user uses a TrackPoint, the user can make a computer perform a function corresponding to a left or right click on a mouse by positioning a mouse cursor with his/her index finger on TrackPoint stick 5 and pressing TrackPoint button 6a or 6b with a thumb or other finger. A user can also scroll a screen in any direction by manipulating TrackPoint stick 5 while pressing TrackPoint button 6c. When the user presses TrackPoint button 6 to the bottom, his/her finger reaches the top surface of guide 8, supported by the highest part of TrackPoint button 6 and the top surface of guide 8, and stops. In this manner, the user enjoys good operability accomplished by a long stroke of TrackPoint button 6 without accidentally touch pad face 2.

As mentioned above, the embodiment can realize good operability by accomplishing preferable arrangement of respective parts in a notebook computer provided with both a TrackPoint and a touch pad. More specifically, although a height and a stroke are determined for a TrackPoint button and a touch pad button in the case of these buttons being provided separately, in consideration of keeping good operability while ensuring compactness for the computer, the embodiment allows such an optimized arrangement and configuration to be kept even in the case of both of these buttons by adopting an inclined pad face for a touch pad. The incline of the pad face of the touch panel can improve operability of the pad face with a thumb when a user operates the keyboard and the touch pad in parallel.

The present invention can be implemented with an alteration if needed without being limited to the above-mentioned embodiment. For example, although TrackPoint button 6 and touch pad button 9 are illustrated as consisting of three and two buttons respectively, a TrackPoint button consisting of two buttons or a touch pad button consisting of one or multiple buttons can be used.

As mentioned above, the present invention can improve operability of a pad face while a keyboard and the pad face are manipulated in parallel by adopting a pad face inclining against the horizon when it is used or against the operation face of the keyboard with lowering the keyboard side. The present invention can accomplish good operability by allowing a preferable arrangement and configuration of respective parts also in the case that both of a stick-type pointing device and a pad-type pointing device are provided.

The constituents of the arrangements described above in the description of the embodiment can be selectively used or can be changed into different arrangements without departing from the gist of the invention.

In the drawings and specifications there has been set forth a preferred embodiment of the invention and, although specific terms are used, the description thus given uses terminology in a generic and descriptive sense only and not for purposes of limitation.

While the present invention has been described with respect to the embodiment of the invention, the technical scope of the present invention is not limited to the described embodiment. Various changes and modifications may be made in the described embodiment. As is apparent from the description in the appended claims, modes of the present invention characterized by such changes and modifications are also included in the technical scope of the invention.

What is claimed is:

1. An input device comprising:
    a keyboard;
    a pad face of a pad pointing device fixed on the user's side from said keyboard; and
    a guide member placed between said keyboard and said pad face;
    wherein said pad face is adapted to horizontally incline relative to the operating face of said keyboard such that said pad face is positioned lower on the keyboard side than the user's side, and
    wherein said guide member is capable of supporting a user's finger at a position which is higher than the lower position of said pad face.

2. The input device according to claim 1, further comprising:
    a palm rest fixed on said keyboard and said pad face;
    wherein the operating face of said keyboard and a surface of said palm rest are placed almost on the same level with said pad face inclining against the level.

3. The input device according to claim 2, further comprising:
    a stick for a stick pointing device provided on said keyboard;
    and a first button for the stick pointing device provided between said keyboard and said pad face;
    wherein said guide member is placed between said first button and said pad face which fixes said pad face in place.

4. The input device according to claim 3, wherein said first button, said guide member, and said pad face are placed adjacent to one another.

5. The input device according to claim 4, wherein the top surface of said guide member is almost as high as the highest part of said pressed first button.

6. The input device according to claim 5, wherein a stroke of said first button ranges from 0.8 mm to 1.5 mm.

7. The input device according to claim 3, further comprising:
    a second button for the pad pointing device provided on the user's side from said pad face; and
    a guide member placed between said pad face and said second button for fixing said pad face in place;
    wherein a difference between heights of the top surface of said guide member and said second button end of said pad face is small enough for a user to easily manipulate an area around the second button end of said pad face.

8. The input device according to claim 7, wherein a stroke of said second button ranges from 0.8 mm to 1.5 mm.

9. The input device according to claim 3, wherein an angle of said pad face inclining against the level of the operating face of said keyboard and the surface of said palm rest is approximately 3.8 degrees.

10. Apparatus comprising:
    a keyboard;
    a pad face of a pad pointing device fixed on the user's side from said keyboard; and
    a guide member placed between said keyboard and said pad face;
    wherein said pad face is adapted to horizontally incline relative to the operating face of said keyboard such that said pad face is positioned lower on the keyboard side than the user's side; and
    a display screen adapted to fold to meet an operating face of said input device, and
    wherein said guide member is capable of supporting a user's finger at a position which is higher than the lower position of said pad face.

11. Apparatus of claim 10, further comprising:
    a palm rest fixed on said keyboard and said pad face;
    wherein the operating face of said keyboard and a surface of said palm rest are placed almost on the same level with said pad face inclining against the level.

12. The input device according to claim 11, further comprising:
    a stick for a stick pointing device provided on said keyboard;
    and a first button for the stick pointing device provided between said keyboard and said pad face;

wherein said guide member is placed between said first button and said pad face which fixes said pad face in place.

13. Apparatus of claim 12, wherein said first button, said guide member, and said pad face are placed adjacent to one another.

14. Apparatus of claim 13, wherein the top surface of said guide member is almost as high as the highest part of said pressed first button.

15. Apparatus of claim 14, wherein a stroke of said first button ranges from 0.8 mm to 1.5 mm.

16. Apparatus of claim 12, further comprising:

a second button for the pad pointing device provided on the user's side from said pad face; and a guide member placed between said pad face and said second button for fixing said pad face in place;

wherein a difference between heights of the top surface of said guide member and a second button end of said pad face is small enough for a user to easily manipulate an area around the second button end of said pad face.

17. Apparatus of claim 16, wherein a stroke of said second button ranges from 0.8 mm to 1.5 mm.

18. Apparatus of claim 12, wherein an angle of said pad face inclining against the level of the operating face of said keyboard and the surface of said palm rest is approximately 3.8 degrees.

* * * * *